United States Patent
Quan et al.

(10) Patent No.: US 11,528,596 B2
(45) Date of Patent: *Dec. 13, 2022

(54) METHOD FOR REPORTING USER EQUIPMENT CAPABILITY INFORMATION AND APPARATUS

(71) Applicant: Huawei Technologies Co., Ltd., Shenzhen (CN)

(72) Inventors: Wei Quan, Beijing (CN); Bin Chen, Chengdu (CN); Bingzhao Li, Beijing (CN); Bin Xu, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

This patent is subject to a terminal disclaimer.

(21) Appl. No.: 17/127,330

(22) Filed: Dec. 18, 2020

(65) Prior Publication Data

US 2021/0105610 A1 Apr. 8, 2021

Related U.S. Application Data

(63) Continuation of application No. 16/287,958, filed on Feb. 27, 2019, now Pat. No. 10,887,758, which is a
(Continued)

(51) Int. Cl.
*H04W 8/22* (2009.01)
*H04W 72/04* (2009.01)
(Continued)

(52) U.S. Cl.
CPC ............ *H04W 8/22* (2013.01); *H04W 8/183* (2013.01); *H04W 8/24* (2013.01); *H04W 72/04* (2013.01);
(Continued)

(58) Field of Classification Search
CPC ....... H04W 8/22; H04W 76/10; H04W 72/04; H04W 72/042
See application file for complete search history.

(56) References Cited

U.S. PATENT DOCUMENTS

| 2012/0040621 A1 | 2/2012 | Jung et al. |
| 2013/0039232 A1 | 2/2013 | Kim et al. |
| (Continued) | | |

FOREIGN PATENT DOCUMENTS

| CN | 101883389 A | 11/2010 |
| CN | 103155632 A | 6/2013 |
| (Continued) | | |

OTHER PUBLICATIONS

Nokia Networks (Rapporteur), "Report of email discussion [91 bis#25] [LTE/CAenh] PDCP control PDU," 3GPP TSG-RAN WG2 Meeting #92, R2-156672, Anaheim, USA, Nov. 16-20, 2015, 8 pages.
(Continued)

*Primary Examiner* — Ashley Shivers
(74) *Attorney, Agent, or Firm* — Slater Matsil, LLP

(57) ABSTRACT

The method includes: obtaining, by UE, UE capability information of the UE; if the size of the UE capability information exceeds the maximum tolerance that can be processed by the PDCP layer of the UE, splitting the UE capability information into at least two pieces of part UE capability information, where each piece does not exceed the maximum tolerance that can be processed by the PDCP layer; and reporting at least one piece of part UE capability information to a network side device. According to this method, the UE capability information is split on a UE side, and reported to the network side device for a plurality of times.

20 Claims, 7 Drawing Sheets

Related U.S. Application Data continuation of application No. PCT/CN2016/097532, filed on Aug. 31, 2016.

(51) Int. Cl.

| | | |
|---|---|---|
| *H04W 8/18* | (2009.01) | |
| *H04W 8/24* | (2009.01) | |
| *H04W 76/10* | (2018.01) | |
| *H04W 76/27* | (2018.01) | |
| *H04W 72/10* | (2009.01) | |
| *H04W 88/02* | (2009.01) | |

(52) U.S. Cl.
CPC ......... *H04W 72/042* (2013.01); *H04W 72/10* (2013.01); *H04W 76/10* (2018.02); *H04W 76/27* (2018.02); *H04W 88/02* (2013.01)

(56) References Cited

U.S. PATENT DOCUMENTS

| | | |
|---|---|---|
| 2013/0044698 A1 | 2/2013 | Susitaival et al. |
| 2013/0208616 A1 | 8/2013 | Thiruvenkatachari et al. |
| 2016/0029421 A1 | 1/2016 | Wang et al. |
| 2016/0050649 A1 | 2/2016 | Park et al. |
| 2016/0205679 A1 | 7/2016 | Yoo et al. |
| 2017/0127315 A1 | 5/2017 | Chen |
| 2017/0339555 A1 | 11/2017 | Henttonen et al. |
| 2018/0255478 A1 | 9/2018 | Yu et al. |

FOREIGN PATENT DOCUMENTS

| | | |
|---|---|---|
| CN | 103460751 A | 12/2013 |
| CN | 103516565 A | 1/2014 |
| CN | 103907365 A | 7/2014 |
| CN | 103974234 A | 8/2014 |
| CN | 104834649 A | 8/2015 |
| CN | 104936296 A | 9/2015 |
| CN | 105103646 A | 11/2015 |
| CN | 105792280 A | 7/2016 |
| CN | 105830530 A | 8/2016 |
| EP | 1220495 A2 | 7/2002 |
| FI | 20002890 A | 6/2002 |
| WO | 2010125769 A1 | 11/2010 |
| WO | 2012021003 A2 | 2/2012 |
| WO | 2014163696 A1 | 10/2014 |
| WO | 2015047051 A1 | 4/2015 |
| WO | 2016123778 A1 | 8/2016 |

OTHER PUBLICATIONS

Ericsson, "Handling of UE capability information in SAE/LTE", 3GPP TSG-RAN WG2 #57-bis, R2-071328, Mar. 26-30, 2007, 4 pages, St. Julian, Malta.

METHOD FOR REPORTING USER EQUIPMENT CAPABILITY INFORMATION AND APPARATUS

CROSS-REFERENCE TO RELATED APPLICATIONS

This application is a continuation of U.S. patent application Ser. No. 16/287,958, filed on Feb. 27, 2019, now U.S. Pat. No. 10,887,758, which is a continuation of International Application No. PCT/CN2016/097532, filed on Aug. 31, 2016. All of the afore-mentioned patent applications are hereby incorporated by reference in their entireties.

TECHNICAL FIELD

The present application relates to the field of wireless communications technologies, and in particular, to a method for reporting user equipment capability information and an apparatus.

BACKGROUND

In a Long Time Evolution (LTE) system, information transmission between user equipment (UE) and a base station (e.g., eNB) is implemented by using an LTE protocol. FIG. 1 is a schematic diagram of an LTE air interface protocol stack. From top to bottom, a UE side successively includes a non-access stratum (NAS), an radio resource control (RRC) layer, a Packet Data Convergence Protocol (PDCP) layer, an radio link control (RLC) layer, a medium access control (MAC) layer, and a physical (PHY) layer. Major services and functions of the RRC layer include broadcasting of system-related non-access stratum (NAS) information, mobility management, paging, and establishment, reestablishment, maintenance, and releasing of an RRC connection between the UE and the eNB, and the like. On the UE side, a data packet generated by the RRC layer needs to be first processed by the PDCP layer, and then transmitted to other protocol layers, such as the RLC layer, the MAC layer, and the PHY layer. Service content provided by the PDCP layer for upper layers such as the RRC layer include data transmission for a control plane and a user plane, and compression, encryption, and integrity protection for an IP packet header, and the like.

In RRC information that needs to be processed by the PDCP layer, an important type of information is UE capability information. The UE capability information refers to a radio access capability that the UE has and a wireless function feature that can be supported by the UE. The UE capability information is used to provide reference for a network side device to perform wireless configuration on the UE. When the network side device needs to obtain the UE capability information, the network side device sends a UE capability request (also called UE Capability Enquiry) message to UE in a connected state. After receiving the capability request message, the UE reports UE capability information to the network side device, so that the network side device learns of a capability of the UE and further serves the UE better.

However, in a data packet processing process, a data packet capacity that can be processed by the PDCP layer is limited. For example, a maximum tolerance of data packets that can be processed by the PDCP layer in an LTE protocol is 8188 octets. As an LTE technology continuously evolves, increasingly more features such as licensed-assisted access (LAA) and massive CA are introduced. Consequently, the UE is required to report increasingly more capability information. Therefore, UE capability information generated by the RRC layer of the UE side becomes increasingly large and even exceeds 8188 octets. According to an existing procedure, when a data packet at the RRC layer is transmitted to the PDCP layer, if the data packet exceeds the maximum tolerance of the data packets that can be processed by the PDCP layer, the PDCP layer is unable to process the data packet, thereby causing an error and further affecting reporting of the UE capability information.

SUMMARY

Embodiments of this application provide a method for reporting user equipment capability information and an apparatus, so as to resolve a problem that an error occurs because when a data packet at an RRC layer is transmitted to a PDCP layer, a size of the data packet exceeds a maximum tolerance that can be processed by the PDCP layer.

According to a first aspect, an embodiment of this application provides a method for reporting user equipment UE capability information, and the method includes: obtaining, by UE, UE capability information of the UE; determining whether a size of the UE capability information exceeds a maximum tolerance that can be processed by a PDCP layer of the UE; if the size of the UE capability information exceeds the maximum tolerance that can be processed by the PDCP layer of the UE, splitting the UE capability information into at least two pieces of part UE capability information, where each piece of split part UE capability information does not exceed the maximum tolerance that can be processed by the PDCP layer; and reporting at least one piece of split part UE capability information to a network side device.

According to the method provided in this aspect, the PDCP layer on a UE side splits, by determining and splitting generated UE capability information, the UE capability information that exceeds the maximum tolerance that can be processed by the PDCP layer, so that split UE capability information is less than the maximum processing tolerance of the PDCP layer, thereby avoiding an error caused by excessively large UE capability information, and ensuring normal operating of a UE capability information reporting process.

With reference to the first aspect, in a first implementation of the first aspect, before the reporting at least one piece of split part UE capability information to a network side device, the method further includes: receiving, by the UE, a first request message that a UE capability needs to be reported, where the first request message is sent by the network side device and includes a system broadcast message and a radio resource control RRC message.

With reference to the first aspect, in a second implementation of the first aspect, the splitting the UE capability information into at least two pieces of part UE capability information includes: splitting the UE capability information according to a RAT system division principle, or splitting the UE capability information according to UE capability importance; or splitting the UE capability information according to a priority of reporting the UE capability; or splitting the UE capability information according to a protocol version sequence principle; or splitting the UE capability information according to a principle of a smallest quantity of times of reporting to the network side device.

With reference to the first aspect, in a third implementation of the first aspect, after the reporting at least one piece of split part UE capability information to a network side device, the method further includes: detecting, by the UE, whether a second request message fed back by the network side device is received; and if the second request message is detected, sending, by the UE, at least one piece of remaining part UE capability information to the network side device. After the UE reports part UE capability information to the network side device for a second time, if the UE further receives a third request message delivered by the network side device, the UE continues to report part UE capability information until the UE reports all split part UE capability information to the network side device, or until the network side device delivers, to the UE, indication information for stopping reporting the UE capability information.

With reference to the first aspect, in a fourth implementation of the first aspect, the splitting the UE capability information into at least two pieces of part UE capability information includes: splitting the UE capability information into at least one piece of detailed UE capability information and rough UE capability information corresponding to the detailed UE capability information, where one piece of rough UE capability information may be corresponding to a plurality of pieces of detailed UE capability information, the detailed UE capability information is used to provide a reference basis for the network side device to configure a radio parameter for the UE, and the rough UE capability information is used to instruct the network side device to send a third request message to the UE; and the reporting at least one piece of split part UE capability information to a network side device includes: reporting the rough UE capability information to the network side device; and if the third request message fed back by the network side device based on the rough UE capability information is received, sending part or all of the detailed UE capability information corresponding to the rough UE capability information to the network side device.

In this implementation of this aspect, the UE first splits the UE capability information into the detailed UE capability information and the rough UE capability information, then reports the rough UE capability information to the network side device, and determines, based on a feedback of the network side device, whether to report the detailed UE capability information corresponding to the rough UE capability information, and to report which detailed UE capability information. On one hand, this implementation is used to avoid exceeding a processing capability of the PDCP layer when the excessively large UE capability information is sent at a time. On the other hand, the UE may report some detailed UE capability information based on a network side requirement, so as to avoid reporting all detailed UE capability information, and save air interface radio resources.

With reference to the first or second implementation of the first aspect, in a fifth implementation of the first aspect, the reporting at least one piece of split part UE capability information to a network side device includes: sorting all split part UE capability information; and if the first request message carries a priority of reporting the part UE capability information, reporting the part UE capability information to the network side device according to the priority.

With reference to any one of the first aspect and the fifth implementation of the first aspect, in a sixth implementation of the first aspect, the splitting the UE capability information into at least two pieces of part UE capability information includes: splitting, by an RRC layer or the PDCP layer of the UE, the UE capability information into at least two parts. In addition, a processor or another layer of the UE splits a data packet that exceeds the maximum processing tolerance of the PDCP layer of the UE.

With reference to any one of the first aspect and the fifth implementation of the first aspect, in a seventh implementation of the first aspect, the reporting at least one piece of split part UE capability information to a network side device includes: receiving and buffering, by an RLC layer of the UE, all the split part UE capability information in a data packet form; segmenting and concatenating data packets of all the part UE capability information to form to-be-transmitted data packets; and reporting the to-be-transmitted data packets to the network side device by using an RRC message. In this implementation of this aspect, the UE side combines all the part UE capability information processed by the PDCP layer, and then reports all the part UE capability information to a base station/the network side device at a time. Because the UE capability information needs to be reported only once, frequent signaling exchanging with a network due to a plurality of times of reporting is avoided, and network overheads are reduced.

With reference to any one of the first aspect and the seventh implementation of the first aspect, in an eighth implementation of the first aspect, each piece of the part UE capability information further includes indication information, and the indication information is used to indicate any one of the following content: whether the UE has remaining part UE capability information, a quantity of times that the remaining part UE capability information needs to be reported, and a order of currently reported part UE capability information in all the part UE capability information. In this implementation of this aspect, the indication information is carried in the RRC message sent by the UE, so that the network side device can obtain a part UE capability information status on the UE side, so as to determine whether to send a request message for the UE capability information to the UE.

According to a second aspect, an embodiment of this application provides a method for receiving UE capability information, where the method is applied to a network side device and includes: sending, by the network side device to UE, a first request message that UE capability information needs to be reported; receiving a first RRC message fed back by the UE based on the first request message, where the first RRC message carries at least one piece of part UE capability information formed after the UE capability information is split; determining, based on the part UE capability information, whether the UE has remaining part UE capability information or whether the UE is further required to report part UE capability information; and if the UE has the remaining part UE capability information or the UE is further required to report the part UE capability information, generating and sending a second request message to the UE; or if the UE does not have the remaining part UE capability information or the UE is not required to report the part UE capability information, generating a stop indication and sending the stop indication to the UE, or skipping sending any indication to the UE. In the method provided in this aspect, the network side device instructs, by delivering a request message to the UE, the UE to report the UE capability information and report which UE capability information. The request message further instructs the UE to stop reporting the UE capability information and the like, so as to implement a reporting process of capability information between the network side device and the UE.

With reference to the second aspect, in a first implementation of the second aspect, the method includes: if the part UE capability information received by the network side device is rough UE capability information, determining whether detailed UE capability information corresponding to the rough UE capability information is required; and if the detailed UE capability information is required, generating and sending a third request message to the UE, so that the UE continues to report the detailed UE capability information.

With reference to the second aspect, in a second implementation of the second aspect, the method further includes: receiving, by the network side device, an RRC message reported by the UE; combining all part UE capability information corresponding to the RRC message and generating total UE capability information of the UE; and sending the combined total UE capability information to an MME, so that after the MME stores the UE capability information, the network side device may directly obtain the UE capability information from the MME, thereby preventing the UE from reporting the UE capability information again, and saving network air interface resources.

With reference to any one of the second aspect and the second implementation of the second aspect, in a third implementation of the second aspect, the first request message includes a system broadcast message and a radio resource control RRC message, and the first request message is used to notify the UE of UE capability information that needs to be selected for reporting, so that when the UE receives the first request message, the UE can learn which UE capability information is to be reported to the network side device.

With reference to any one of the second aspect and the second implementation of the second aspect, in a fourth implementation of the second aspect, the first request message further indicates a priority of reporting the part UE capability information by the UE, so that the UE reports the part UE capability information according to the priority.

According to a third aspect, an embodiment of this application further provides a method for expanding a PDCP layer processing tolerance, where the method includes: setting a maximum tolerance of data packets that can be processed by a PDCP layer on a UE side and/or a network side to be no less than 8188 octets. That is, a size of the data packets that can be processed by the PDCP layer is expanded to a value greater than 8188 octets, and further, the processing tolerance of the PDCP layer is expanded to an infinite size. In this aspect, a processing capability of the PDCP layer is improved, so as to resolve a problem that an error occurs when a data packet received by the PDCP layer is too large for processing.

According to the third aspect, an embodiment of this application further provides user equipment UE, including a receiving unit, a processing unit, and a sending unit, where the receiving unit is configured to obtain UE capability information of the UE; the processing unit is configured to: determine whether a size of the UE capability information exceeds a maximum tolerance that can be processed by a PDCP layer of the UE; and if the size of the UE capability information exceeds the maximum tolerance that can be processed by the PDCP layer of the UE, split the UE capability information into at least two pieces of part UE capability information, where each piece of split part UE capability information does not exceed the maximum tolerance that can be processed by the PDCP layer; and the sending unit is configured to report at least one piece of split part UE capability information to a network side.

According to the UE provided in this aspect, a function of determining and segmenting the size of the UE capability information by an RRC layer of the UE and a mechanism of reporting for a plurality of times when the UE capability information is excessively large are added, so as to avoid affecting a reporting process of the UE capability information when a data packet transmitted to the PDCP layer exceeds the maximum tolerance that can be processed by the PDCP layer.

In addition, the UE is further configured to implement various implementations of the first aspect.

According to a fourth aspect, an embodiment of this application further provides a base station, where the base station is applied to a network side device and includes a sending unit, a receiving unit, and a processing unit, the sending unit is configured to send, to UE, a first request message that UE capability information needs to be reported; the receiving unit is configured to receive a first RRC message fed back by the UE based on the first request message, where the first RRC message carries at least one piece of part UE capability information formed after the UE capability information is split; the processing unit is configured to: determine, based on the part UE capability information, whether the UE has remaining part UE capability information or whether the UE is further required to report part UE capability information, and if the UE has the remaining part UE capability information or the UE is further required to report the part UE capability information, generate a second request message; and the sending unit is further configured to send the second request message to the UE.

In addition, the base station is further configured to implement various implementations of the second aspect.

According to a fifth aspect, an embodiment of this application further provides a mobility management entity MME, configured to: receive and store all or some UE capability information sent by a network side device, and send the stored UE capability information to the network side device when the network side device needs the UE capability information, so as to prevent UE from reporting the UE capability information again, and save air interface resources.

According to a sixth aspect, an embodiment of this application further provides user equipment, including a receiver, a processor, and a transmitter, the receiver is configured to obtain UE capability information of the UE; the processor is configured to: determine whether a size of the UE capability information exceeds a maximum tolerance that can be processed by a PDCP layer of the UE; and if the size of the UE capability information exceeds the maximum tolerance that can be processed by the PDCP layer of the UE, split the UE capability information into at least two pieces of part UE capability information, where each piece of split part UE capability information does not exceed the maximum tolerance that can be processed by the PDCP layer; and the transmitter is configured to report at least one piece of split part UE capability information to a network side device.

With reference to the sixth aspect, in a first implementation of the sixth aspect, the receiver is further configured to receive a first request message that a UE capacity needs to be reported, where the first request message is sent by the network side device and includes a system broadcast message and an RRC message.

With reference to the sixth aspect, in a second implementation of the sixth aspect, the processor is further configured to split the UE capability information according to a RAT system division principle; or split the UE capability information according to UE capability importance; or split the UE capability information according to a protocol version sequence principle; or split the UE capability information according to a principle of a smallest quantity of times of reporting to the network side device.

With reference to the sixth aspect, in a third implementation of the sixth aspect, the processor is further configured to detect whether a second request message fed back by the network side device is received; and the transmitter is further configured to: if the second request message is detected, send, by the UE, at least one piece of remaining part UE capability information to the network side device.

With reference to the sixth aspect, in a fourth implementation of the sixth aspect, the processor is further configured to split the UE capability information into at least one piece of detailed UE capability information and rough UE capability information corresponding to the detailed UE capability information, where the detailed UE capability information is used to provide reference for the network side device to configure a radio parameter for the UE, and the rough UE capability information is used to instruct the network side device to send a third request message to the UE; and the transmitter is further configured to: report the rough UE capability information to the network side device, and if the third request message fed back by the network side device based on the rough UE capability information is received, send part or all of the detailed UE capability information corresponding to the rough UE capability information to the network side device.

With reference to the first or second implementation of the sixth aspect, in a fifth implementation of the sixth aspect, the processor is further configured to sort all split part UE capability information; and the transmitter is further configured to: if the first request message carries a priority of reporting the part UE capability information, report the part UE capability information to the network side device according to the priority.

With reference to any one of the sixth aspect and the fifth implementation of the sixth aspect, in a sixth implementation of the sixth aspect, an RRC layer or the PDCP layer of the UE splits the UE capability information into at least two parts.

With reference to any one of the sixth aspect and the fifth implementation of the sixth aspect, in an seventh implementation of the sixth aspect, the receiver is further configured to receive and buffer all the split part UE capability information in a data packet form; the processor is further configured to segment and concatenate data packets of all the part UE capability information to form to-be-transmitted data packets; and the transmitter is further configured to report the to-be-transmitted data packets to the network side device by using an RRC message.

According to a seventh aspect, an embodiment of this application further provides a base station, where the base station is applied as network side device and includes a transmitter, a receiver, and a processor, the transmitter is configured to send, to UE, a first request message that UE capability information needs to be reported; the receiver is configured to receive a first RRC message fed back by the UE based on the first request message, where the first RRC message carries at least one piece of part UE capability information formed after the UE capability information is split; the processor is configured to: determine, based on the part UE capability information, whether the UE has remaining part UE capability information or whether the UE is further required to report part UE capability information; and if the UE has the remaining part UE capability information or the UE is further required to report the part UE capability information, generate a second request message; and the transmitter is further configured to send the second request message to the UE.

With reference to the seventh aspect, in a first implementation of the seventh aspect, the processor is further configured to: if the part UE capability information received by the network side device is rough UE capability information, determine whether detailed UE capability information corresponding to rough UE capability information is required, and if the detailed UE capability information is required, generate a third request message; and the transmitter is further configured to send the third request message to the UE.

With reference to the seventh aspect, in a second implementation of the seventh aspect, the receiver is further configured to receive an RRC message reported by the UE; the processor is further configured to: combine all part UE capability information corresponding to the RRC message and generate total UE capability information of the UE; and the transmitter is further configured to send the combined total UE capability information to an MME.

With reference to any one of the seventh aspect and the second implementation of the seventh aspect, in a third implementation of the seventh aspect, the first request message includes a system broadcast message and an RRC message, and the first request message is used to notify the UE of UE capability information that needs to be selected for reporting.

With reference to any one of the seventh aspect and the second implementation of the seventh aspect, in a fourth implementation of the seventh aspect, the first request message further indicates a priority of reporting the part UE capability information by the UE, so that the UE reports the part UE capability information according to the priority.

According to an eighth aspect, an embodiment of this application further provides a computer storage medium, where the computer storage medium may store a program. When the program is executed, some or all steps of various implementations in the method for reporting user equipment capability information provided in this application may be implemented.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

DETAILED DESCRIPTION OF ILLUSTRATIVE EMBODIMENTS

To make persons skilled in the art better understand the technical solutions in the present application, the following clearly describes the technical solutions in the embodiments of the present application with reference to the accompanying drawings in the embodiments of the present application. Apparently, the described embodiments are merely some rather than all of the embodiments of the present application.

Figure 2:
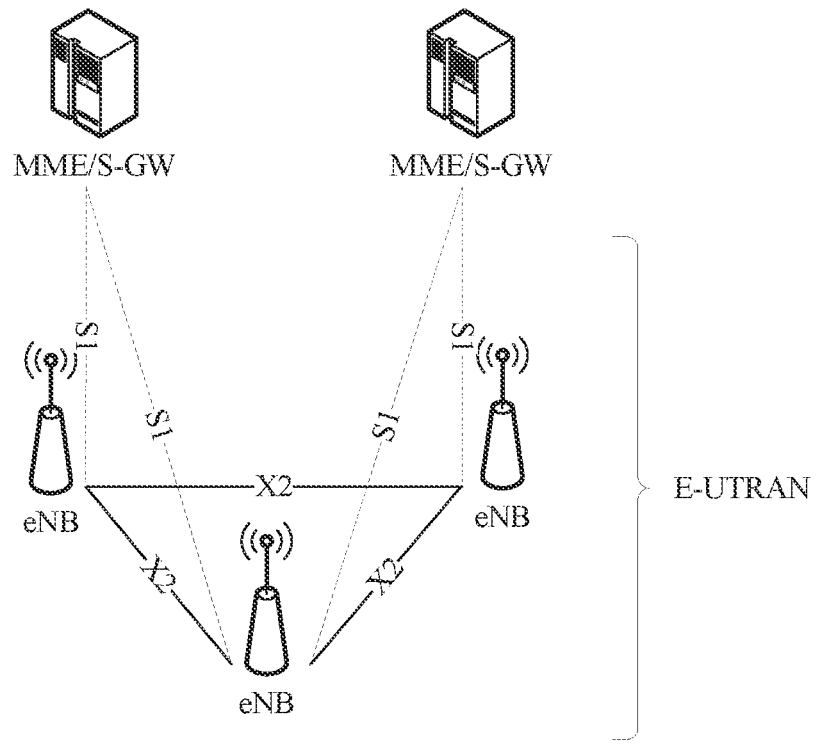
FIG. 2 is a schematic diagram of an LTE network architecture according to an embodiment of this application.

The technical solutions provided in this application are mainly applied to various wireless communications systems, such as an LTE system, UMTS, an LTE-like system, or a 5G system, where specific architectures of the foregoing wireless communications systems are not limited. In this application, an LTE network architecture shown in FIG. 2 is used as an example to describe an application scenario in the technical solutions of this application. The LTE network architecture shown in FIG. 2 includes at least one mobility management entity (MME) or serving gateway (S-GW), at least one base station (e.g., eNodeB, eNB for short), and at least one user equipment (UE) or evolved UMTS terrestrial radio access network (E-UTRAN). Each base station is also referred to as an access device and is configured to communicate with the UE. The MME is a mobility management entity and is configured to be responsible for a positioning and paging process of the UE. In addition, the MME is further configured to process signaling and the like. The MME/S-GW communicates with the eNB by using an S1 communications interface, and each two eNBs communicate with each other by using an X2 communications interface.

Figure 1:
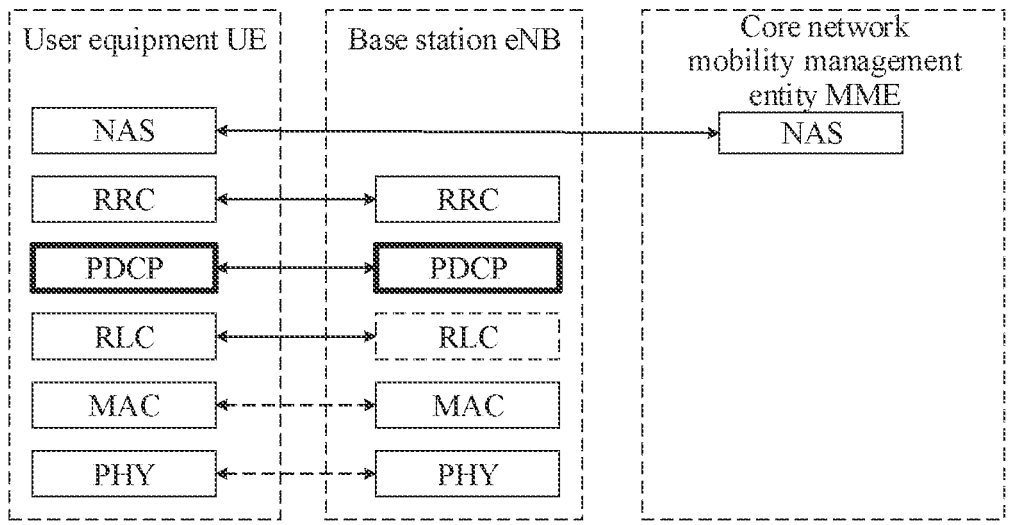
FIG. 1 is a schematic diagram of an LTE air interface protocol stack according to an embodiment of this application.

As shown in FIG. 1, after a data packet of UE capability information generated at an RRC layer of a UE side is processed by a PDCP layer, the data packet passes through each layer of the UE from top to bottom and is finally sent to an eNB after passing through a PHY layer. After receiving information or a data packet sent by the UE, a PHY layer of the eNB processes the received information from bottom to top based on a structure hierarchy of an LTE air interface protocol stack. When passing through the PDCP layer of the UE or the PDCP layer of the eNB, if the UE capability information or the data packet is greater than a maximum tolerance 8188 octets that can be processed by the PDCP layer, an error is caused, and transmission of the data packet of the UE capability information is affected.

A method for reporting user equipment UE capability information provided in this application is used to resolve a problem that when a data packet of UE capability information at an RRC layer is transmitted to the PDCP layer, an error occurs because the data packet of the UE capability information exceeds a maximum tolerance that can be processed by the PDCP layer.

The UE capability information described in this application is a radio access capability that the UE has and a wireless function feature that can be supported by the UE.

Embodiment 1

Figure 3:
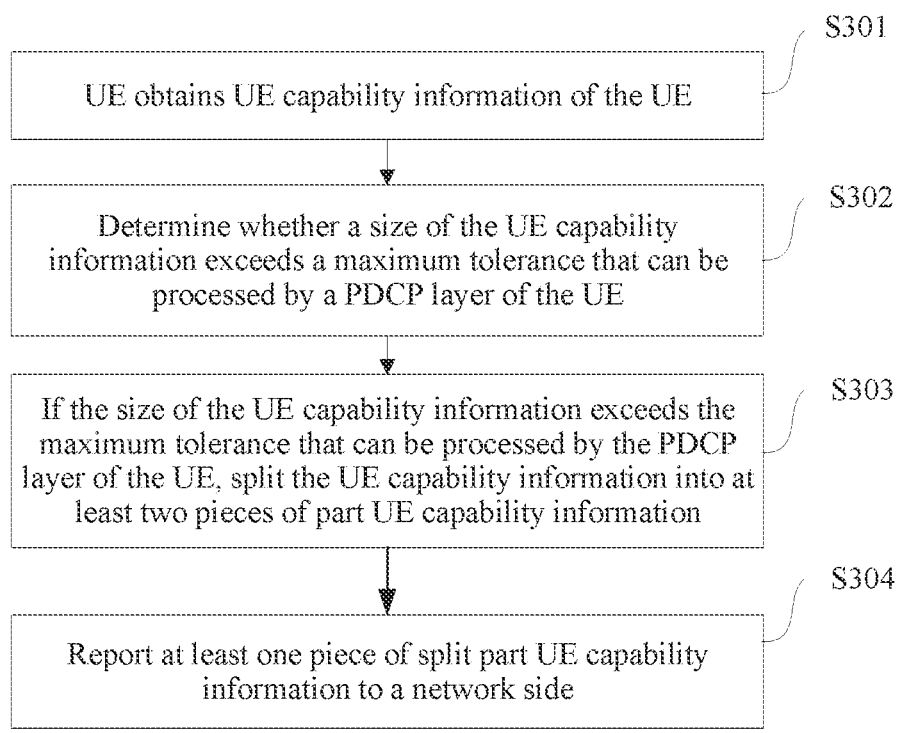
FIG. 3 is a schematic flowchart of a method for reporting UE capability information according to an embodiment of this application.

FIG. 3 shows a method for reporting user equipment UE capability information, and the method includes the following steps.

Step S301: UE obtains UE capability information of the UE.

Optionally, when a network side device needs the UE capability information, the network side device sends a first request message to UE which is in connected mode and connected to the network side device, where the first request message is also referred to as a UE Capability Enquiry message or an RRC message. The first request message may be a system broadcast message, or may be a dedicated RRC message. The first request message is used to notify the UE of UE capability information that needs to be selected for reporting. After receiving the message, the UE generates the UE capability information, so that the UE obtains the UE capability information of the UE. The UE capability information may further be fixed capability information of the UE and is stored on a UE side. When the network side device needs the UE capability information, the UE reports the UE capability information.

Step S302: Determine whether a size of the UE capability information exceeds a maximum tolerance that can be processed by a PDCP layer of the UE.

Generally, a maximum tolerance of data packets that can be processed by the PDCP layer of the UE is 8188 octets, that is, a maximum PDCP SDU is 8188 octets. In step S302, the UE determines whether the UE capability information generated by the UE exceeds 8188 octets. Octet is a computer term and means that an octet is used in an Internet standard. In a binary digital concept, 1 byte is 8 bits. Further, the octet in this embodiment of this application may be defined as 1 octet=8 bits.

Step S303: If the size of the UE capability information exceeds the maximum tolerance that can be processed by the PDCP layer of the UE, split the UE capability information into at least two pieces of part UE capability information, where each piece of split part UE capability information does not exceed the maximum tolerance that can be processed by the PDCP layer.

Specifically, if it is determined that the UE capability information exceeds 8188 octets, the UE capability information is split according to a radio access technology (RAT) system division principle, or split according to UE capability importance, or split according to a UE capability reporting priority, or split according to a protocol version sequence principle, or split according to a principle of a smallest quantity of times of reporting to the network side device. Regardless of which splitting method is used, it is ensured that each piece of split part UE capability information does not exceed the maximum tolerance that can be processed by the PDCP layer.

Alternatively, the UE capability information may be directly split by an RRC layer of the UE to generate a first part UE capability information, a second part UE capability information, a third part UE capability information, and the like. In this application, the UE capability information may be split by the RRC layer of the UE, or may be split by the PDCP layer or another processing unit of the UE. If the UE capability information is split by the RRC layer of the UE, the UE first encapsulates split UE capability information into several data packets and sends each data packet to the PDCP layer.

Step S304: Report at least one piece of split part UE capability information to a network side device.

Figure 4:
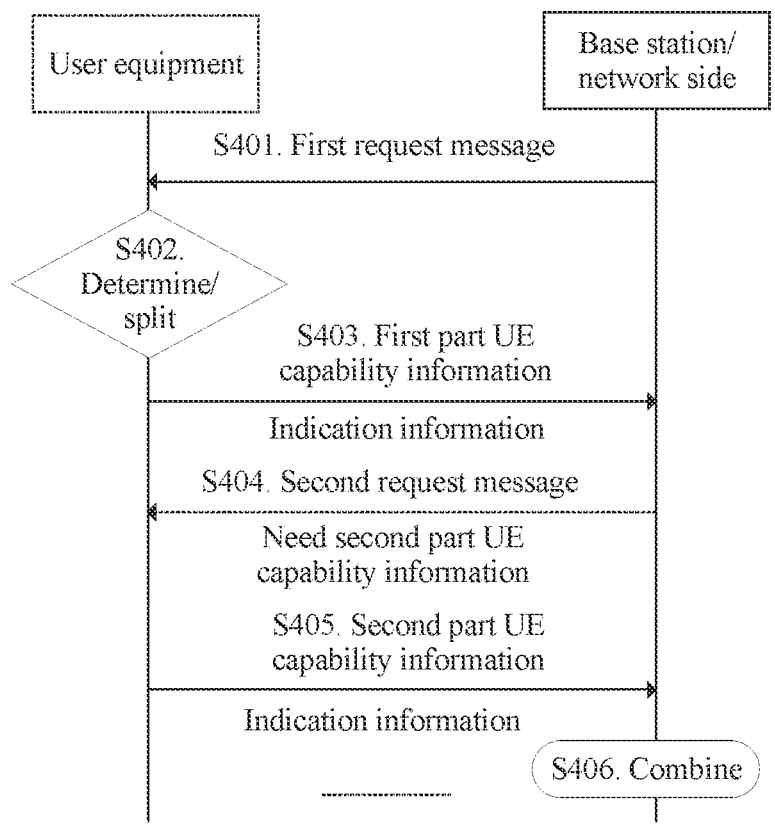
FIG. 4 is a signaling flowchart of a method for reporting UE capability information according to an embodiment of this application.

Specifically, the UE reports the split part UE capability information to the network side device by using an RRC message. This embodiment of this application provides various manners of reporting the UE capability information by the UE. Optionally, one process of reporting the UE capability information is as follows:

As shown in FIG. 4, after receiving a first request message, user equipment UE determines and splits UE capability information of the UE (S402), and reports split first part UE capability information to a base station/a network side device by using a first RRC message (S403). Optionally, the first RRC message further includes indication information. The indication information is used to indicate to or notify the base station/the network side device whether there is remaining part UE capability information that needs to be reported, and/or how many pieces of part UE capability information remain, and/or which part UE capability information remains, and/or how many parts the UE capability information is split and which part is currently reported, or of a proportion of the currently reported first part UE capability information in total UE capability information, or the like.

If after the base station/the network side device receives the first RRC message, and there is remaining part UE capability information on a UE side based on the indication information included in the first RRC message or the UE capability information is not reported completely, the base station/the network side device generates a second request (or the Second UE Capability Enquiry) message, and sends the second request message to the UE (S404). The second request message is used to instruct the UE to continue reporting part UE capability information. After receiving the second request message, the UE reports split second part UE capability information to the base station/the network side device by using a second RRC message (S405). In addition, the second RRC message also includes indication information, used to notify the base station whether there is remaining UE capability information. If the indication information indicates that the UE has reported all UE capability information to the base station/the network side device, the base station/the network side device combines all received part UE capability information (S406) and stores combined UE capability information, so as to provide a service for the UE subsequently based on the UE capability information.

Optionally, in step S403, if the first RRC message sent by the UE to the base station/the network side device does not include the indication information, the base station/the network side device needs to determine whether to require the UE to continue reporting the UE capability information. In addition, if the base station/the network side device determines that all the UE capability information sent by the UE has been received, or that the UE is not required to send the UE capability information, the base station/the network side device delivers a stop indication to the UE, so that the UE stops continuing reporting the UE capability information, or stops sending any indication to the UE.

In addition, after step S406, after receiving the UE capability information, the network side device sends the UE capability information to a mobility management entity (MME) for storage. After the MME stores all the UE capability information, when the UE returns to an idle state and enters a connected state again, the network side device may obtain the UE capability from the MME, so that the UE does not need to report the UE capability information again, thereby saving air interface resources.

Specifically, the base station/the network side device may combine all the UE capability information and send combined UE capability information to the MME for storage, or directly forward part UE capability information to an MME device each time the base station/the network side device receives the part UE capability information reported by the UE, and the MME device performs combination and storage.

According to the method provided in this embodiment, the PDCP layer of the UE side splits, by determining and splitting the generated UE capability information, the UE capability information that exceeds the maximum tolerance that can be processed by the PDCP layer, so that split UE capability information is less than a maximum processing tolerance of the PDCP layer, thereby avoiding an error caused by excessively large UE capability information and ensuring normal operating of a UE capability information reporting process.

Embodiment 2

Figure 5:
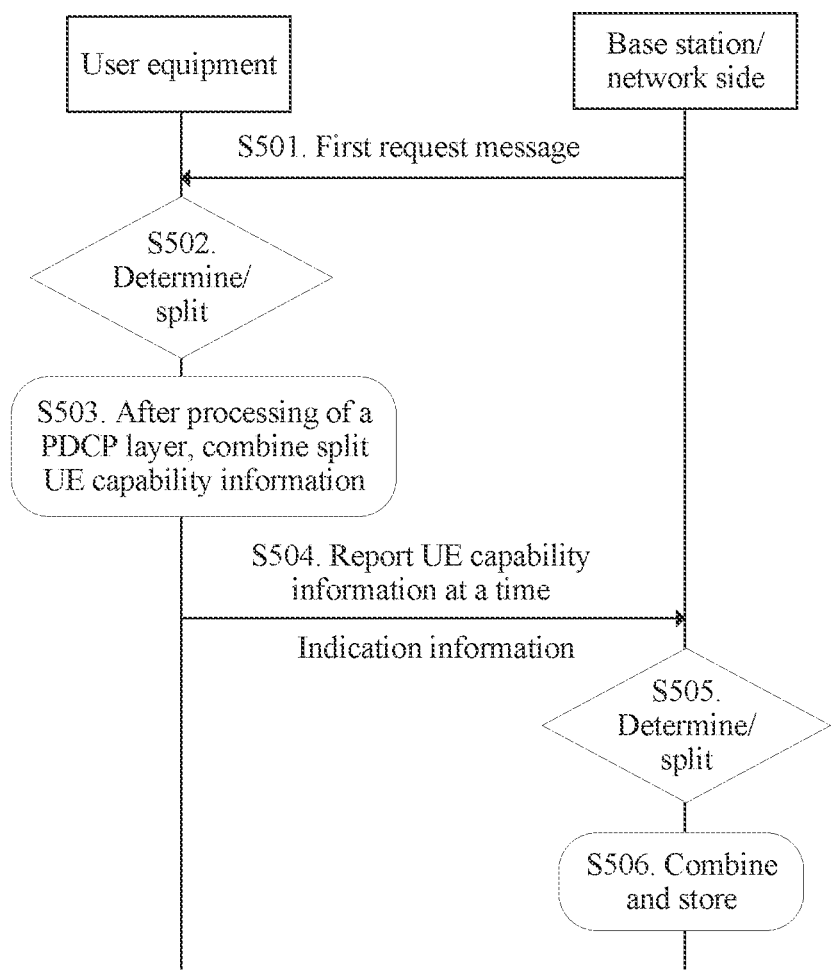
FIG. 5 is a signaling flowchart of another method for reporting UE capability information according to an embodiment of this application.

As shown in FIG. 5, another method for reporting UE capability information is provided, and a first step S501 and a second step S502 of the method are respectively the same as S401 and S402 in Embodiment 1.

Optionally, in step S502, an RRC layer or a PDCP layer of UE splits UE capability information evenly into several pieces of part UE capability information, and each piece of split part UE capability information does not exceed a maximum processing tolerance of the PDCP layer.

Step S503: After the split part UE capability information is processed at the PDCP layer, combine all processed part UE capability information. Optionally, after an RLC layer segments and concatenates the processed part UE capability information or after the processed part UE capability information is multiplexed at a MAC layer, the processed part UE capability information is combined into one piece of UE capability information and is encapsulated into an RRC message.

Step S504: Report the encapsulated RRC message to a base station/a network side device at a time. Further, the RRC message carries total UE capability information, and further includes information indicating that there is no remaining UE capability information on the UE.

Step S505: The base station/the network side device receives the RRC message, and transmits the UE capability information from bottom to top based on a stipulation of an LTE air interface protocol stack, and a PDCP layer of the base station/the network side device determines whether the UE capability information exceeds a maximum tolerance that can be processed the PDCP layer of by the base station/the network side device, that is, 8188 octets. If the size of the UE capability information exceeds the maximum tolerance, the UE capability information is split into at least two pieces of part UE capability information to ensure that the PDCP layer can normally process the UE capability information, and avoid an error.

Step S506: After processing all part UE capability information, the PDCP layer of the base station/the network side device combines and stores processed part UE capability information. Optionally, the base station/the network side device sends combined total UE capability information to an MME.

According to the method provided in this embodiment, the part UE capability information processed by the PDCP layer is combined on the UE side, and then reported to the base station/the network side device at a time. Because the UE capability information needs to be reported only once, signaling exchanging with a network in a plurality of reporting processes is avoided, and network overheads are reduced.

Embodiment 3

Figure 6:
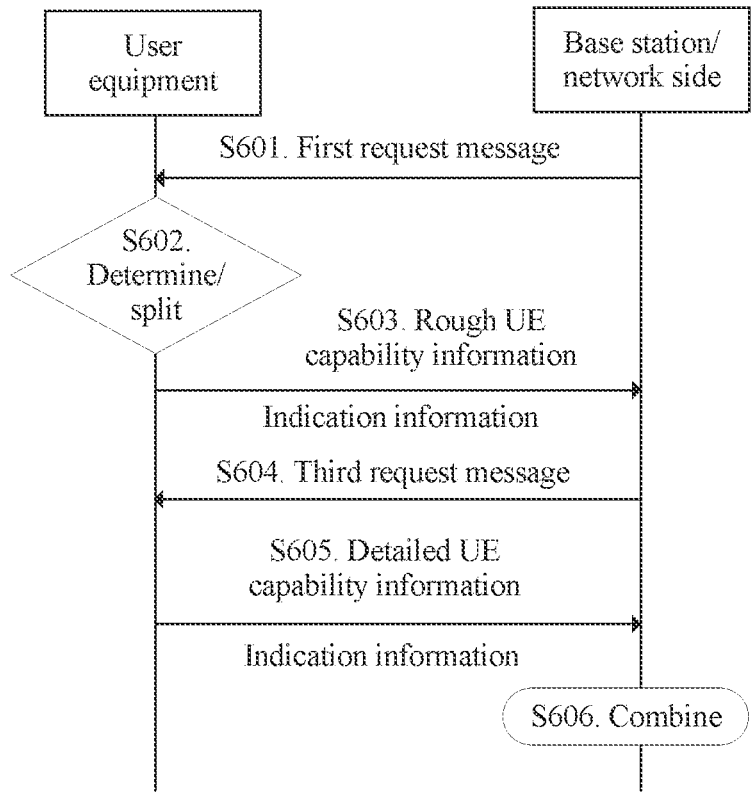
FIG. 6 is a signaling flowchart of still another method for reporting UE capability information according to an embodiment of this application.

In this embodiment, as shown in FIG. 6, step S601 is the same as the first step in the foregoing embodiment.

Step S602: When UE determines that UE capability information of the UE is greater than a maximum tolerance that can be processed by a PDCP layer, the UE splits the UE capability information into at least one piece of detailed UE capability information and rough UE capability information corresponding to the detailed UE capability information. The detailed UE capability information is used by the network side device to configure a radio parameter, and the rough UE capability information is used to instruct the network side device to send a third request message to the UE.

Further, the so-called rough UE capability information means that the network side device can learn, based on the rough UE capability information, that the UE has a capability, but cannot determine specific capability information of the UE. For example, when the rough UE capability information is that the UE supports a carrier aggregation (CA) capability, the network side device can only learn, based on the rough UE capability information, that the UE may support CA, but the network side device cannot learn which bandwidths (band) or carriers are supported by the UE for aggregation. In this case, the UE needs to further report the detailed UE capability information, so that the network side device configures a multicarrier aggregation function for the UE. In another example, if the rough UE capability information is that the UE supports an LTE Release 10 capability, the network side device can only learn, based on the rough UE capability information, that the UE may support a Release 10 feature, such as CA, relay, or Coordinated Multiple Points, also referred to coordinated multipoint transmission/reception (CoMP), but the network side device does not know that the UE specifically supports which Release 10 feature. In this case, the UE needs to further report the detailed UE capability information. The so-called rough capability information includes information that enables the network side device based on a classification manner to obtain only a total UE function, but does not include specific UE capability information.

Further, when the UE capability information is split, important or necessary UE capability information may be classified as detailed UE capability information, and a less important UE capability information is classified as rough UE capability information; or based on a sequence of an LTE release, information in an earlier release is classified as detailed UE capability information, and a capability in a later release is classified as rough UE capability information; or based on RAT division, capability information in a current RAT is classified as detailed UE capability information, and capability information in another RAT is used as rough UE capability information; or the like.

Step S603: After division, first report the rough UE capability information to a network side device.

Step S604: A base station/the network side device receives the rough UE capability information, and determines whether to require the UE to report the detailed UE capability information; and if requiring the UE to report the detailed UE capability information, the base station/the network side device generates a third request message and sends the third request message to the UE.

Step S605: If the UE receives the third request message fed back by the network side device based on the detailed UE capability information, the UE sends part or all of the detailed UE capability information corresponding to the rough UE capability information to the network side device.

Optionally, if the rough UE capability information is corresponding to a plurality of pieces of detailed UE capability information, the UE may report the detailed UE capability information for a plurality of times according to an instruction of the network side device. The detailed UE capability information reported by the UE to the network side device may also carry indication information, used to notify the network side device of content, such as whether there is remaining detailed UE capability information, and which detailed UE capability information remains.

Step S606: The base station/the network side device combines and stores the received rough UE capability information and detailed UE capability information, and sends combined UE capability information to a mobility management entity MME. This step is the same as step S406 and S506 in the foregoing embodiments, and details are not described again.

Compared with Embodiment 1 and Embodiment 2, in this embodiment, the UE capability information of the UE is divided into two parts: One part is the detailed UE capability information, and the other part is the rough UE capability information. In addition, the detailed UE capability information is corresponding to the rough UE capability information. Therefore, during reporting, the UE first reports the rough UE capability information based on a requirement of the network side device. If the detailed UE capability information is required, the UE continues to report the detailed UE capability information corresponding to the rough UE capability information. On one hand, a case in which excessively large UE capability information is sent at a time and exceeds a processing capability of the PDCP layer is avoided; and on the other hand, part detailed capability information may be reported based on a network requirement, and not all detailed capability information needs to be reported, thereby saving air interface radio resources.

Embodiment 4

This embodiment is an improvement of the first step in the foregoing embodiment. Specifically, the improvement is as follows:

Step 1: A base station or a network side device broadcasts a first request message (or UE Capability Enquiry) to all UE within coverage of the base station or the network side device. The first request message carries indication information, used to indicate which UE within the coverage needs to report UE capability information, and a priority of reporting the UE capability information by different UE. Optionally, the broadcasting may be that the base station or the network side device notifies the UE by sending a system message. Step 2: An RRC layer of the UE determines, based on the received first request message, which UE capability information needs to be reported by the RRC layer.

Step 3: The UE first sends to-be-reported UE capability information to a PDCP layer in a form of a data packet, and then reports the data packet to the network side device by using an RRC message.

Further, if the first request message carries a priority of reporting part UE capability information, the part UE capability information is reported to the network side device according to the priority.

Step 4: The network side device receives the RRC message reported by the UE, and determines, based on indication information in the RRC message, whether to require the UE to continue reporting the UE capability information. If the UE is required to continue reporting the UE capability information, the network side device delivers a second request message to the UE, where the second request message may include indication information, used to indicate that the second request message is targeted for remaining part UE capability information.

Step 5: If the UE receives the second request message targeted for the remaining part UE capability information, the remaining part UE capability information is sent to the PDCP layer, processed by the PDCP layer, and reported to the network side device. If the remaining part capability information is still greater than a maximum processing tolerance of the PDCP layer, namely, 8188 octets, the UE capability information is split by using a same method as that in the foregoing embodiment, and reported to the network side device for a plurality of times.

Step 6: After receiving all part UE capability information, the network side device combines and stores the UE capability information, so as to subsequently provide a service for the UE based on the UE capability information.

Optionally, step 7: After receiving the UE capability information, the network side device sends the capability information to an MME. After the MME stores all the UE capability information of the UE, when the UE returns to an idle state and enters a connected state again, the network side device may obtain a UE capability from the MME, so that the UE does not need to report the UE capability information again, thereby saving air interface resources.

In this embodiment, the network side device or the base station sends a broadcast message within the coverage of the network side device or the base station, where the broadcast message carries the indication information of the UE capability that needs to be reported by the UE, so that the UE that receives the broadcast message prepares respective UE capability information, and sends the respective UE capability information to the network side device when the UE receives a request message delivered by the network side device. In the broadcast message manner, the following case may be avoided: When the network side device delivers a request message that the UE capability needs to be reported, a large quantity of indication information is carried and occupies a large quantity of time-frequency resources. In addition, the network side device periodically broadcasts a message, so as to avoid sending, each time new UE accesses the network side device, a UE capability request message that carries indication information, and further reduce network overheads.

Embodiment 5

To avoid that UE capability information obtained by a UE side or a network side exceeds a maximum tolerance that can be processed by the UE side or the network side, this embodiment provides a method for expanding a processing tolerance of a PDCP layer. The method includes: setting a minimum quantity of data packets that can be processed by the PDCP layer to 8188 octets. That is, a processing capability of the PDCP layer is expanded, so that the PDCP layer can process data more than 8188 octets.

A specific extension manner may be expanding a size limit of data packets that can be processed by the PDCP layer to a value greater than 8188 octets, or to an infinite size, or the like.

According to the method for expanding a processing tolerance of a PDCP layer provided in this embodiment, the size of the UE capability information brings no limitation after the processing tolerance is expanded, so as to avoid an error caused when excessively large UE capability information is sent at a time and exceeds the maximum tolerance that the PDCP layer can process.

Embodiment 6

Figure 7:
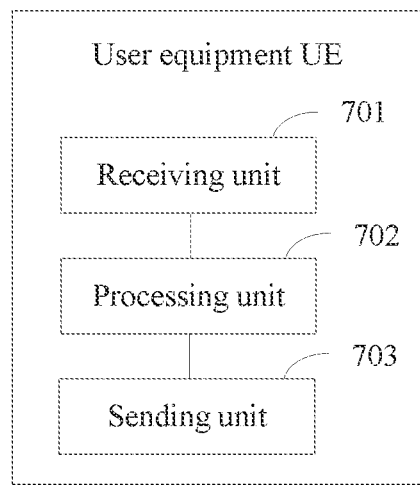
FIG. 7 is a structural block diagram of UE according to an embodiment of this application.

Corresponding to the method embodiment, this application further provides user equipment UE. As shown in FIG. 7, the user equipment includes a receiving unit 701, a processing unit 702, and a sending unit 703.

The receiving unit 701 is configured to obtain UE capability information of the UE. The UE capability information may be generated in advance and stored, or may be generated after a request for reporting the UE capability information is received.

The receiving unit 701 is further configured to receive a first request message that a UE capability needs to be reported, where the first request message is sent by a network side device and includes a system broadcast message and a dedicated or ordinary RRC message.

The processing unit 702 is configured to: determine whether a size of the UE capability information exceeds a maximum tolerance that can be processed by a PDCP layer of the UE; and if the size of the UE capability information exceeds the maximum tolerance that can be processed by the PDCP layer of the UE, split the UE capability information into at least two pieces of part UE capability information, where each piece of split part UE capability information does not exceed the maximum tolerance that can be processed by the PDCP layer.

Specifically, the processing unit 702 is further configured to split the UE capability information according to a RAT system division principle; or split the UE capability information according to UE capability importance; or split the UE capability information according to a protocol version sequence principle; or split the UE capability information according to a principle of a smallest quantity of times of reporting to the network side device.

The processing unit 702 is further configured to: send split part UE capability information to the PDCP layer of the UE by using data packets, and process the data packets of the split UE capability information.

The sending unit 703 is configured to report at least one piece of split part UE capability information to the network side device.

Further, after the UE reports part UE capability information for the first time, the processing unit 702 is further configured to detect whether a second request message fed back by the network side device is received; and if the second request message is detected, the UE sends at least one piece of remaining part UE capability information to the network side device by using the sending unit 703.

Further, the processing unit 702 is further specifically configured to split the UE capability information into at least one piece of detailed UE capability information and rough UE capability information corresponding to the detailed UE capability information. The detailed UE capability information is used by the network side device to configure a radio parameter, and the rough UE capability information is used to instruct the network side device to send a third request message to the UE.

The sending unit 703 is further configured to: report the rough UE capability information to the network side device; and if the third request message fed back by the network side device based on the rough UE capability information is received, send part or all of the detailed UE capability information corresponding to the rough UE capability information to the network side device.

Optionally, if a request message sent by a base station/the network side device and received by the UE indicates a priority of sending the part UE capability information, the sending unit 703 is further configured to report the part UE capability information to the network side device according to the priority.

Optionally, the receiving unit 701 is further configured to receive and buffer all split part UE capability information in a data packet form. The processing unit 702 is further configured to segment and concatenate data packets of all the part UE capability information to form to-be-transmitted data packets. The sending unit 703 is further configured to report the to-be-transmitted data packets to the network side device by using an RRC message.

In addition, the user equipment further includes a storage unit. The storage unit is configured to store the UE capability information and the received request message.

Figure 8:
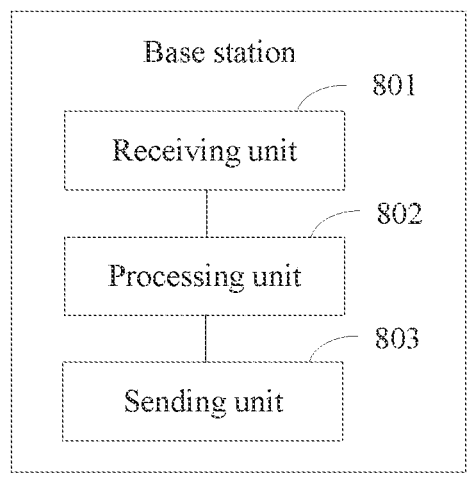
FIG. 8 is a structural block diagram of a base station according to an embodiment of this application.

In another embodiment, corresponding to the foregoing user equipment, this embodiment provides a base station applied to a network side device. As shown in FIG. 8, the base station includes a receiving unit 801, a sending unit 803, and a processing unit 802.

The sending unit 803 is configured to send, to UE, a first request message that a UE capability needs to be reported.

The receiving unit 801 is configured to receive a first RRC message fed back by the UE based on the first request message. The first RRC message carries at least one piece of part UE capability information formed after UE capability information is split.

The processing unit 802 is configured to: determine, based on the part UE capability information, whether the UE has remaining part UE capability information or whether the UE is further required to report part UE capability information; and if the UE has the remaining part UE capability information or the UE is further required to report the part UE capability information, generate a second request message; or if the UE does not have the remaining part UE capability information or the UE is not required to report the part UE capability information, generate a stop indication.

The sending unit 803 is further configured to send the second request message to the UE, or send the stop indication to the UE.

Further, the processing unit 802 is further configured to: if the part UE capability information received by the network side device is the rough UE capability information, determine whether the detailed UE capability information corresponding to the rough UE capability information is required, and if the detailed UE capability information is required, generate a third request message. The sending unit 803 sends the third request message to the UE.

Further, the receiving unit 801 is further configured to receive all RRC messages reported by the UE. After all the RRC messages are received, the processing unit 802 combines part UE capability information corresponding to the RRC messages to generate total UE capability information of the UE, and sends the combined total UE capability information to an MME by using the sending unit 803.

In addition, the base station provided in this application further includes a storage unit, configured to store the UE capability information reported by the UE and the generated request message.

Figure 9:
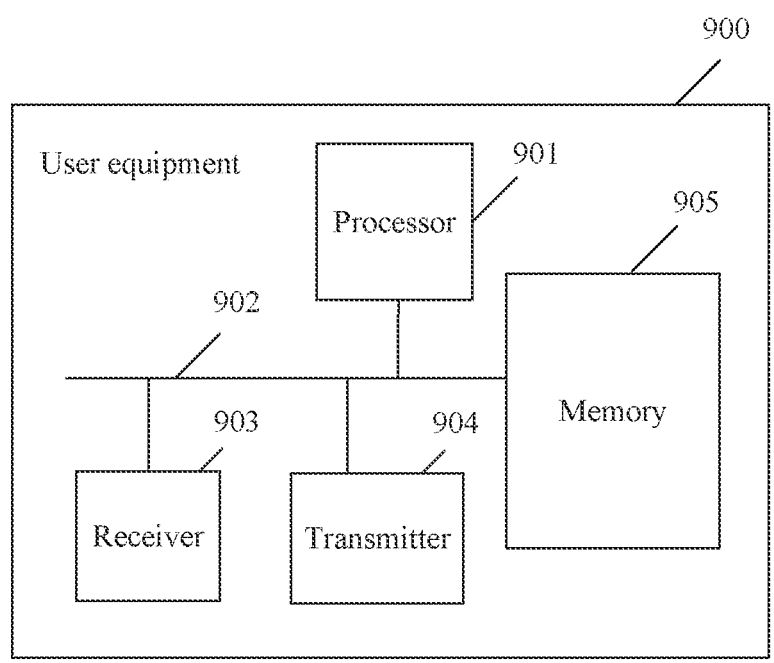
FIG. 9 is a schematic structural diagram of hardware of UE according to an embodiment of this application.
Figure 10:
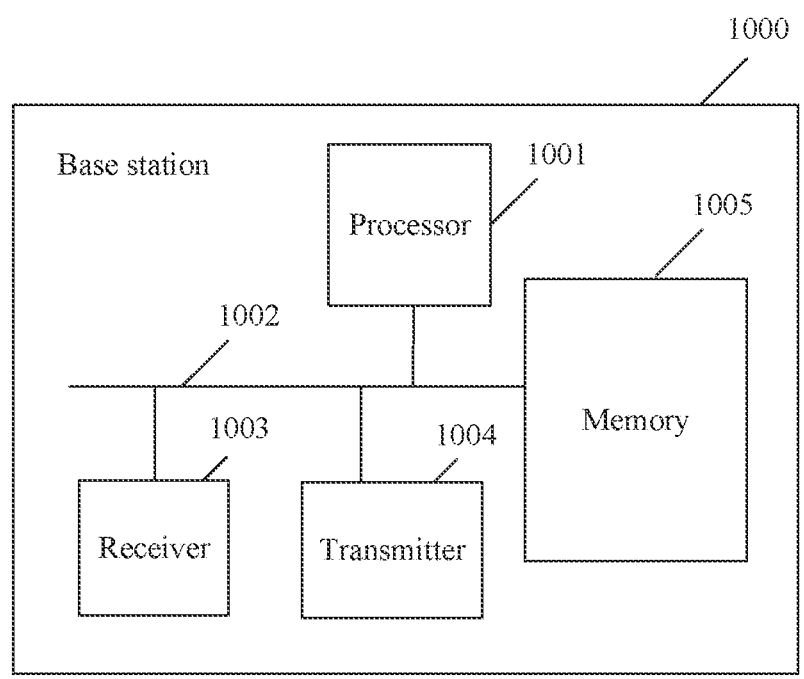
FIG. 10 is a schematic structural diagram of hardware of a base station according to an embodiment of this application.

In specific hardware embodiments, FIG. 9 and FIG. 10 are respectively schematic diagrams of user equipment and a base station. Corresponding to the embodiments of the foregoing methods for reporting UE capability information and receiving UE capability information, each base station and terminal device include a processor, a transmission bus, a receiver, a transmitter, and a memory.

In the user equipment, functions of a receiver 903 and a transmitter 904 are respectively equivalent to those of the receiving unit 701 and the sending unit 703 in the foregoing apparatus embodiment, and are configured to receive and send a message between the base station and the user equipment. A function of a processor 901 is equivalent to that of the processing unit 702. The processor 901 of the user equipment is mainly configured to determine and split UE capability information, so as to ensure that a size of a data packet of the UE capability information transmitted to a PDCP layer does not exceed a maximum tolerance that can be processed by the PDCP layer.

On a base station or a network side device, functions of a receiver 1003 and a transmitter 1004 are respectively equivalent to those of the receiving unit 801 and the sending unit 803 in the foregoing apparatus embodiment. A processor on the base station or the network side device is configured to: send, to the UE, a first request message that UE capability information needs to be reported, receive an RRC message of the UE, determine whether to require the UE to report the UE capability information again, and if the UE is required to report the UE capability information, generate and send a second request message to ensure that the base station or the network side device can obtain required UE capability information.

Further, the processor may be a general-purpose central processing unit (CPU), a microprocessor, an application-specific integrated circuit (ASIC), or one or more integrated circuits configured to control program execution of the solution in the present application.

A communications bus 902 or 1002 may include a path for transmitting information between the foregoing components. The receiver and the transmitter include any type of transceiver apparatus, and are configured to communicate with another device or communications network, such as Ethernet, a radio access network (RAN), or a wireless local area network (WLAN).

A memory 905 or 1005 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may independently exist, or may be integrated into the processor. The memory is configured to store application program code used to execute the solutions of the present application, where the application program code is executed under control of the processor. The processor is configured to execute the application program code stored in the memory.

The user equipment described in this application is configured to implement all or some functions of the method for reporting UE capability information in the foregoing embodiment. The base station/the network side device is configured to implement all or some functions of the method for receiving UE capability information in the foregoing embodiment.

The terminal device described in this application includes user equipment (UE), a user terminal, a client, and the like. Specifically, the terminal device further includes a mobile phone, a tablet computer, a handheld computer, a mobile Internet device, or the like.

In the foregoing embodiment, the "unit" may refer to an application-specific integrated circuit (ASIC), a circuit, a processor that executes one or more software or firmware programs and a memory, an integrated logic circuit, and/or another device that can provide the foregoing functions.

An embodiment of the present application further provides a computer storage medium, configured to store a computer software instruction used in the method for reporting user equipment capability information in FIG. 9 or FIG. 10. The computer software instruction includes a program designed to perform the foregoing method embodiments. Sending of a feedback parameter may be implemented by executing the stored program.

Although the present application is described with reference to the embodiments, in a process of implementing the present application that claims protection, persons skilled in the art may understand and implement other variations of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. The fact that some measures are recited in mutually different dependent claims does not indicate that a combination of these measures cannot bring better effects.

Persons skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code. The computer program is stored/distributed in an appropriate medium, provided with other hardware or as a part of hardware, or may be distributed in another form such as in the Internet or in another wired or wireless telecommunications system.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method comprising:
   generating a data packet of user equipment (UE) capability information in a Radio Resource Control (RRC) layer;
   determining that a size of the data packet of the UE capability information exceeds a maximum processing tolerance of a Packet Data Convergence Protocol (PDCP) layer;
   splitting the data packet of the UE capability information into at least two pieces in the RRC layer, wherein each piece of the data packet of the UE capability information does not exceed the maximum processing tolerance of the PDCP layer; and
   transmitting the at least two pieces of the data packet to a network side device using separate RRC messages, wherein each RRC message comprises first indication information indicating an order of a carried piece of the data packet in all the at least two pieces of the data packet.

2. The method according to claim 1, wherein before transmitting the at least two pieces of the data packet to the network side device using the separate RRC messages, the method further comprising:
   receiving a request message indicating that the UE capability information needs to be reported, wherein the request message is received from the network side device and is carried in a radio resource control (RRC) message.

3. The method according to claim 1, wherein splitting the data packet of the UE capability information into the at least two pieces in the RRC layer comprises:
   splitting the data packet of the UE capability information according to a principle of a smallest quantity of times of reporting the UE capability information to the network side device.

4. The method according to claim 1, wherein transmitting the at least two pieces of the data packet to the network side device using the separate RRC messages comprises:

sorting all the at least two pieces of the data packet of the UE capability information; and in response to receiving a request message that carries a priority of reporting the UE capability information, transmitting the at least two pieces to the network side device according to the priority.

5. The method according to claim 1, wherein each RRC massage further comprises second indication information, and the second indication information indicates one of following: having a remaining piece of the data packet of the UE capability information, or having no remaining piece of the data packet of the UE capability information.

6. An apparatus, comprising:
a memory storage comprising instructions; and
one or more processors in communication with the memory storage, wherein the instructions, when executed by the one or more processors, cause the apparatus to:
generate a data packet of user equipment (UE) capability information in a Radio Resource Control (RRC) layer;
determine that a size of the data packet of the UE capability information exceeds a maximum processing tolerance of a Packet Data Convergence Protocol (PDCP) layer;
split the data packet of the UE capability information into at least two pieces in the RRC layer, wherein each piece of the data packet of the UE capability information does not exceed the maximum processing tolerance of the PDCP layer; and
transmit the at least two pieces of the data packet to a network side device using separate RRC messages, wherein each RRC message comprises first indication information, and the first indication information indicates an order of a carried piece of the data packet in all the at least two pieces of the data packet.

7. The apparatus according to claim 6, wherein the instructions, when executed by the one or more processors, further cause the apparatus to:
receive a request message indicating that the UE capability information needs to be reported, wherein the request message is received from the network side device and is carried in an RRC message.

8. The apparatus according to claim 6, wherein the instructions, when executed by the one or more processors, further cause the apparatus to:
split the data packet of the UE capability information according to a principle of a smallest quantity of times of reporting the UE capability information to the network side device.

9. The apparatus according to claim 6, wherein the instructions, when executed by the one or more processors, further cause the apparatus to:
sort all pieces of the data packet of the UE capability information; and
in response to receiving a request message that carries a priority of reporting the UE capability information, transmit the at least two pieces to the network side device according to the priority.

10. The apparatus according to claim 6, wherein each RRC massage further comprises second indication information, and the second indication information indicates one of following: having a remaining piece of the data packet of the UE capability information, or having no remaining piece of the data packet of the UE capability information.

11. A method comprising:
receiving at least two RRC messages from a user equipment (UE), wherein each RRC message comprises a piece of a plurality of pieces of a data packet of UE capability information, and each piece of the data packet of the UE capability information does not exceed a maximum processing tolerance of a PDCP layer; and each RRC message comprises first indication information indicating an order of a carried piece in the plurality of pieces of the data packet of the UE capability information; and
combining the plurality of pieces of the data packet of the UE capability information associating with the at least two RRC messages to generate the data packet of the UE capability information.

12. The method according to claim 11, wherein before receiving the at least two RRC messages from the UE, the method further comprises:
transmitting a request message indicating that the UE capability information needs to be reported by the UE, wherein the request message is carried in a RRC message.

13. The method according to claim 12, wherein the request message carries a priority of reporting the UE capability information.

14. The method according to claim 11, wherein the data packet of the UE capability information is split into the plurality of pieces according to a principle of a smallest quantity of times of reporting the UE capability information.

15. The method according to claim 11, wherein each RRC massage further comprises second indication information, and the second indication information indicates one of following: having a remaining piece of the data packet of the UE capability information, or having no remaining piece of the data packet of the UE capability information.

16. An apparatus comprising:
a memory storage comprising instructions; and
one or more processors in communication with the memory storage, wherein the instructions, when executed by the one or more processors, cause the apparatus to:
receive at least two RRC messages from a user equipment (UE), wherein each RRC message comprises a piece of a plurality of pieces of a data packet of UE capability information, and each piece of the data packet of the UE capability information does not exceed a maximum processing tolerance of a PDCP layer; and each RRC message comprises first indication information indicating an order of a carried piece in the plurality of pieces of the data packet of the UE capability information; and
combine the plurality of pieces of the data packet of the UE capability information associating with the at least two RRC messages to generate the data packet of the UE capability information.

17. The apparatus according to claim 16, wherein the instructions, when executed by the one or more processors, further cause the apparatus to:
transmit a request message indicating that the UE capability information needs to be reported by the UE, wherein the request message is carried in a RRC message.

18. The apparatus according to claim 17, wherein the request message carries a priority of reporting the UE capability information.

19. The apparatus according to claim 16, wherein the data packet of the UE capability information is split into the plurality of pieces according to a principle of a smallest quantity of times of reporting the UE capability information.

20. The apparatus according to claim 16, wherein each RRC massage further comprises second indication information, and the second indication information indicates one of following: having a remaining piece of the data packet of the UE capability information, or having no remaining piece of the data packet of the UE capability information.

* * * * *